(12) United States Patent
Kim et al.

(10) Patent No.: US 9,632,379 B2
(45) Date of Patent: Apr. 25, 2017

(54) DISPLAY DEVICE

(71) Applicant: Samsung Display Co., Ltd., Yongin, Gyeonggi-Do (KR)

(72) Inventors: In Cheol Kim, Goyang-si (KR); Seung Ho Nam, Seongnam-si (KR); Yoon Gyu Lee, Uijeongbu-si (KR); IL Ho Lee, Pyeongtaek-si (KR); Hyun-Ju Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 181 days.

(21) Appl. No.: 14/340,013

(22) Filed: Jul. 24, 2014

(65) Prior Publication Data

US 2015/0062453 A1    Mar. 5, 2015

(30) Foreign Application Priority Data

Aug. 28, 2013    (KR) ........................ 10-2013-0102542

(51) Int. Cl.
| | | |
|---|---|---|
| *G02F 1/1343* | (2006.01) | |
| *G02F 1/1362* | (2006.01) | |
| *G02F 1/1368* | (2006.01) | |
| *G06F 3/041* | (2006.01) | |
| *G06F 3/044* | (2006.01) | |

(52) U.S. Cl.
CPC .. *G02F 1/136286* (2013.01); *G02F 1/134363* (2013.01); *G06F 3/044* (2013.01); *G06F 3/0416* (2013.01); *G02F 2001/134318* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 7,995,041 B2 | 8/2011 | Chang | |
| 8,217,913 B2 | 7/2012 | Hotelling et al. | |
| 2004/0239650 A1* | 12/2004 | Mackey | ................. G06F 3/044 |
| | | | 345/174 |
| 2005/0122827 A1* | 6/2005 | Wang | ................... G09G 3/3677 |
| | | | 365/232 |
| 2009/0225260 A1* | 9/2009 | Adachi | ............. G02F 1/133707 |
| | | | 349/139 |
| 2010/0110035 A1* | 5/2010 | Selker | .................... G09G 5/003 |
| | | | 349/12 |
| 2011/0141042 A1 | 6/2011 | Kim et al. | |
| 2011/0175835 A1 | 7/2011 | Wang | |

(Continued)

FOREIGN PATENT DOCUMENTS

KR    1020120121705 A    11/2012

*Primary Examiner* — Ryan Crockett
(74) *Attorney, Agent, or Firm* — Cantor Colburn LLP

(57) ABSTRACT

A display device includes: a first substrate; a plurality of pixel electrodes disposed on the first substrate; a common electrode including a plurality of common electrode plates disposed on the first substrate, where the common electrode plates cover the pixel electrodes and are arranged substantially in a matrix form; and a plurality of common electrode line groups which applies a common voltage to the common electrode plates, in which laterally adjacent common electrode plates of the common electrode plates are connected to different common electrode line groups.

20 Claims, 12 Drawing Sheets

(56) References Cited

U.S. PATENT DOCUMENTS

| | | | |
|---|---|---|---|
| 2011/0187677 A1* | 8/2011 | Hotelling | G02F 1/13338 345/174 |
| 2012/0133614 A1 | 5/2012 | Bytheway et al. | |
| 2012/0249444 A1* | 10/2012 | Lee | G02F 1/13338 345/173 |
| 2014/0062943 A1* | 3/2014 | Choi | G06F 3/0412 345/174 |
| 2014/0078104 A1* | 3/2014 | Lee | G06F 3/044 345/174 |

* cited by examiner

DISPLAY DEVICE

This application claims priority to Korean Patent Application No. 10-2013-0102542, filed on Aug. 28, 2013, and all the benefits accruing therefrom under 35 U.S.C. §119, the contents of which are incorporated by reference herein in its entirety.

BACKGROUND (a) Field

Exemplary embodiments of the invention relate to a display device and a driving method thereof, and more particularly, to a display device having a touch sensing function.

(b) Description of the Related Art

A flat panel display, such as a liquid crystal display ("LCD"), typically includes a field generating electrode and an electro-optical active layer. The LCD may include a liquid crystal layer as the electro-optical active layer, an organic light emitting diode display may include an organic emission layer as the electro-optical active layer, and an electrophoretic display may include charged particles. The field generating electrode is connected to a switching element, such as a thin film transistor, to receive a data signal, and the electro-optical active layer converts the data signal to an optical signal to display an image.

Recently, such a display device may include a touch sensing function for an interaction with a user, in addition to a function of displaying the image. The touch sensing function is to find touch information such as whether a touch by an object occurs a screen, a location of the touch, or the like by sensing changes in pressure, charges, light, or the like applied to a screen of the display device, when the user writes texts or draws figures on the screen by touching of a finger or a touch pen on the screen. The display device may receive an image signal based on the touch information.

A display panel having the touch sensing function typically includes a plurality of X-axis lines extending in a row direction and a plurality of Y-axis lines extending in a column direction to recognize the touched location.

In a manufacturing process of such a display device, an optical mask for providing a plurality of separate X-axis lines and a plurality of separate Y-axis lines extending in a column direction is typically used.

SUMMARY

Exemplary embodiments of the invention provide a display device having with reduced number of optical masks using in a manufacturing process and with reduced manufacturing costs.

An exemplary embodiment of the invention provides a display device, including: a first substrate; a plurality of pixel electrodes disposed on the first substrate; a common electrode including a plurality of common electrode plates disposed on the first substrate, where the common electrode plates cover the pixel electrodes and are arranged substantially in a matrix form; and a plurality of common electrode line groups which applies a common voltage to the plurality of common electrode plates, in which laterally adjacent common electrode plates of the common electrode plates are connected to different common electrode line groups.

In an exemplary embodiment, the display device may further include a plurality of touch signal lines to which the common voltage and a sensing input signal are applied; and a touch signal processor which determines an occurrence of a touch based on a sensing output signal from the touch signal line, in which the laterally adjacent common electrode plates may be connected to different touch signal lines.

In an exemplary embodiment, the touch signal lines may be connected to the common electrode line groups, respectively.

In an exemplary embodiment, the display device may further include a first signal line which applies the common voltage to the touch signal lines, a second signal line which applies the sensing input signal to the touch signal lines, and a third signal line which receives the sensing output signal from the touch signal lines.

In an exemplary embodiment, the first signal line, the second signal line or the third signal line may be disposed in the touch signal processor.

In an exemplary embodiment, when the display device displays an image, the touch signal lines may be all connected to the first signal line to receive the common voltage, and when the display device does not display the image, one of the touch signal lines may receive the sensing input signal through the second signal line, and then the one of the touch signal lines may output the sensing output signal through the third signal line.

In an exemplary embodiment, the display device may further include a gate driver which applies a gate voltage to a plurality of pixels including the pixel electrodes, in which the touch signal processor is disposed in the gate driver.

In an exemplary embodiment, the display device may further include a gate driver which applies a gate voltage to a plurality of pixels including the pixel electrodes and a signal processor which controls the gate driver, in which the touch signal processor is disposed in the signal processor.

In an exemplary embodiment, two different touch signal lines may be disposed at opposing sides of the common electrode plates, respectively.

In an exemplary embodiment, a size of the common electrode plate may be about 4 millimeters (mm)×about 5 millimeters (mm).

In an exemplary embodiment, a period during which the display device does not display the image may correspond to a vertical blank period.

In an exemplary embodiment, the common electrode may be disposed above the pixel electrodes.

In an exemplary embodiment, a plurality of openings may be defined in the common electrode plates.

In an exemplary embodiment, the display device may further include a plurality of data lines disposed on the first substrate, and a plurality of gate lines disposed on the first substrate, in which the data lines and gate lines may be insulated from each other and cross each other.

In an exemplary embodiment, the common electrode line groups may be disposed in a same layer as the gate lines.

In an exemplary embodiment, each of the common electrode line groups may include three common electrode lines.

In an exemplary embodiment, each of the common electrode line groups may be connected to a corresponding common electrode plate of the common electrodes plate through a contact hole.

In an exemplary embodiment, the display device may further include a liquid crystal layer disposed on the first substrate.

In an exemplary embodiment, the display device may further include a second substrate disposed on the liquid crystal layer.

In an exemplary embodiment, the openings in the common electrode plates may be curved.

According to exemplary embodiments of the invention, a display device includes a touch sensor defined by a driving signal lines thereof such that the display device has light weight, thin thickness, and reduced power consumption, and manufacturing costs thereof is reduced.

In such embodiments, the number of the optical masks used in the manufacturing process of the display device having the touch sensing function is reduced without separately providing an electrode for transferring a sensing input signal.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
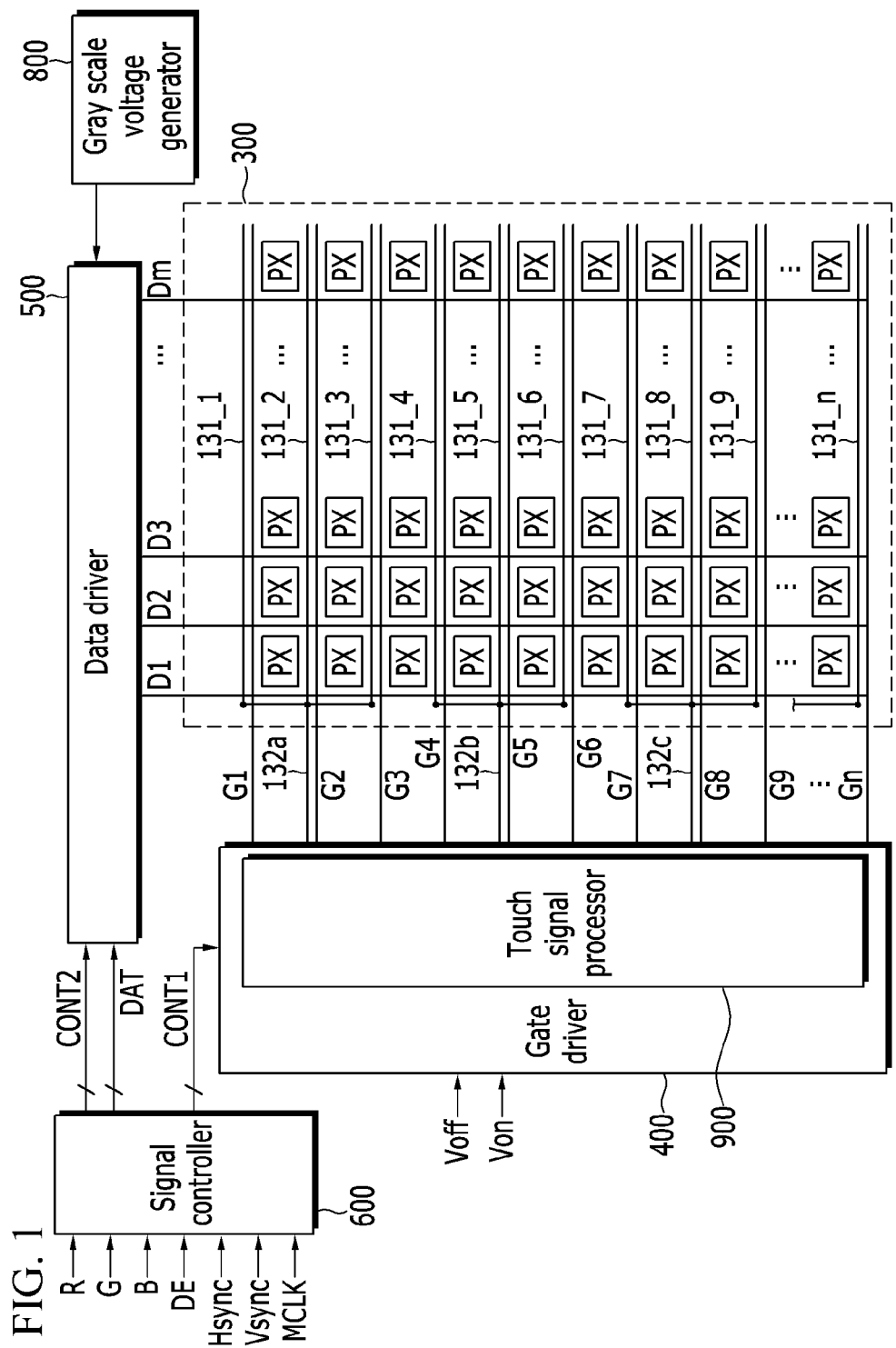
FIG. 1 is a block diagram illustrating an exemplary embodiment of a display device, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of a display device and a driving method thereof, according the invention, will be described in detail with reference to the accompanying drawings.

First, an exemplary embodiment of a display device according to the invention will be described in detail with reference to FIG. 1.

FIG. 1 is a diagram illustrating an exemplary embodiment of a display device, according to the invention.

Referring to FIG. 1, an exemplary embodiment of a liquid crystal display includes a display panel 300 and driving devices, which includes a gate driver 400 including a touch signal processor 900, a data driver 500, a grayscale voltage generator 800 and a signal controller 600.

Referring to FIG. 1, the display panel 300 includes a plurality of signal lines G1 to Gn and D1 to Dm, and a plurality of pixels PX connected to the signal lines and arranged substantially in a matrix form, when viewed from an equivalent circuit. In such an embodiment, the display panel 300 includes a plurality of common electrode lines, e.g., first to n-th common electrode lines 131_1 to 131_n.

The common electrode lines 131_1 to 131_n are divided into a plurality of common electrode line groups. In an exemplary embodiment, each common electrode line group includes a predetermined number of common electrodes lines, e.g., three common electrode lines, of the common electrode lines 131_1 to 131_n. Ends of the common electrode lines 131 in a same common electrode line group are connected to each other. In such an embodiment, the other ends of the common electrode lines 131 in the same common electrode line group are connected to each other. Hereinafter, an exemplary embodiment, in which three common electrodes lines defines a common electrode group, e.g., of the first to third common electrode lines 131_1 to 131_3 define a first common electrode line group 134A, of the fourth to sixth common electrode lines 131_4 to 131_6 define a second common electrode line group 134B, and of the ninth to twelfth common electrode lines 131_9 to 131_12 define a third common electrode line group 134C, will be described. However, the invention is not limited thereto.

In an alternative exemplary embodiment, each common electrode line group may be defined by more than or less than three common electrode lines 131.

The common electrode line groups 134A, 134B and 134C are connected to touch signal lines 132a, 132b and 132c, respectively. According to an exemplary embodiment of the invention, the common electrode line groups 134A, 134B and 134C receive a common voltage, a sensing input signal, or a sensing output signal through the touch signal lines 132a, 132b and 132c.

The signal lines G1 to Gn and D1 to Dm include a plurality of gate lines G1 to Gn that transfers gate signals (referred to as "scanning signals"), and a plurality of data lines D1 to Dm that transfers data voltages. The gate lines G1 to Gn extend substantially in a row direction and are substantially parallel to each other, and the data lines D1 to Dm extend substantially in a column direction and are substantially parallel to each other.

In an exemplary embodiment, the display device may be a liquid crystal display including the common electrode lines disposed only in some pixel rows among a plurality of pixel rows.

In an exemplary embodiment, each common electrode line may include a plurality of extensions, in which a contact hole for connection thereof with a common electrode is defined. The contact hole for connection between a common electrode line 131 and a common electrode 270 may be defined only in some pixels of the pixels that define a dot.

In such an embodiment, a polarizer (not illustrated) may be provided in the display panel 300.

The grayscale voltage generator 800 generates all grayscale voltages or a predetermined number of grayscale voltages (hereinafter, referred to as "reference grayscale voltages") related to transmittance of the pixel PX. The (reference) grayscale voltages may include a grayscale voltage having a positive value and a grayscale voltage having a negative value with respect to a common voltage.

The gate driver 400 is connected to the gate lines G1 to Gn of the display panel 300 to apply gate signals, which are configured by combining a gate-on voltage Von and a gate-off voltage Voff, to the gate lines G1 to Gn.

In an exemplary embodiment, the gate driver 400 includes a touch signal processor 900. The touch signal processor 900 supplies the common voltage or the sensing input signal TX to the common electrode lines 131_1 to 131_n through the touch signal lines 132a, 132b and 132c, or receives the sensing output signal RX from the common electrode lines 131_1 to 131_n.

The touch signal processor 900 is connected to the touch signal lines 132a, 132b and 132c. According to an exemplary embodiment of the invention, each of the common electrode line groups 134A, 134B and 134C receives the common voltage, the sensing input signal or the sensing output signal through a corresponding touch signal line of the touch signal lines 132a, 132b and 132c.

In an exemplary embodiment, the touch signal processor 900 may sense a touch on a predetermined portion of the display panel 300 based on the sensing output signal RX. An exemplary embodiment of a method of sensing a touch based on the sensing output signal RX by the touch signal processor 900 will be described later in detail.

According to an exemplary embodiment, as shown in FIG. 1, the touch signal processor 900 may be integrated in the gate driver 400, but not being limited thereto. In an alternative exemplary embodiment, the touch signal processor 900 may be disposed outside the gate driver 400. In another alternative exemplary embodiment, the touch signal processor 900 may be disposed in or integrated in the signal controller 600.

The data driver 500 is connected to the data lines D1 to Dm of the display panel 300, and selects grayscale voltages from the grayscale voltage generator 800, and applies the selected grayscale voltages to the data lines D1 to Dm as data voltages. In an exemplary embodiment, where the grayscale voltage generator 800 does not provide all the grayscale voltages, but provides only a predetermined number of reference grayscale voltages, the data driver 500 generates desired grayscale voltages by dividing the reference grayscale voltages.

The signal controller 600 controls the gate driver 400, the data driver 500, and the like.

In an exemplary embodiment, the driving devices 400, 500, 600, 800 and 900 may be directly installed on the display panel 300 in an integrated circuit ("IC") chip form, installed on a flexible printed circuit film (not illustrated) to be attached to the display panel 300 in a tape carrier package ("TCP") form, or installed on a separate printed circuit board (not illustrated). In an alternative exemplary embodiment, the drive devices 400, 500, 600, 700, 800 and 900 may be integrated on the display panel 300 together with the signal lines G1 to Gn and D1 to Dm, a thin film transistor switching element (not illustrated), and the like. In an exemplary embodiment, the drive devices 400, 500, 600, 700, 800 and 900 may be integrated in a single chip. In such an embodiment, at least one of the drive devices or at least one circuit element of the drive devices may be disposed outside the single chip.

Next, an operation of an exemplary embodiment of the display device will be described in detail.

In an exemplary embodiment, the signal controller 600 receives input image signals R, G and B and an input control signal for controlling display of the input image signals R, G and B from an external graphic controller (not illustrated). The input image signals R, G and B store luminance information of each pixel PX, and luminance has a predetermined number of grayscale values, for example, 1024 (=2$^{10}$), 256 (=2$^8$), or 64 (=2$^6$) grayscale values. In an exemplary embodiment, the input control signal may include a vertical synchronization signal Vsync, a horizontal synchronization signal Hsync, a main clock MCLK, a data enable signal DE, and the like.

The signal controller 600 processes the input image signals R, G and B based on the operational condition of the display panel 300, and generates a gate control signal CONT1 and a data control signal CONT2 based on the input image signals R, G and B and the input control signal, and then the signal controller 600 transmits the gate control signal CONT1 to the gate driver 400, and transmits the data control signal CONT2 and a processed image signal DAT to the data driver 500.

The gate control signal CONT1 includes a scanning start signal that instructs scanning start and a clock signal that controls an output period of the gate-on voltage Von. The gate control signal CONT1 may further include an output enable signal that limits a duration time of the gate-on voltage Von.

The data control signal CONT2 includes a horizontal synchronization start signal that notifies transmission start of the digital image signal DAT for pixels PX in each row, a load signal that instructs application of an analog data voltage to the data lines D1 to Dm, and a data clock signal. The data control signal CONT2 may further include an inversion signal that inverts a polarity of the data voltage with respect to the common voltage (hereinafter, "polarity of the data voltage").

Based on the data control signal CONT2 from the signal controller 600, the data driver 500 receives the digital image signals DAT for pixels PX and selects a grayscale voltage corresponding to each digital image signal DAT to convert the digital image signal DAT into an analog data voltage, and then apply the converted analog data voltage to the corresponding data lines D1 to Dm.

The gate driver 400 applies the gate-on voltage Von to the gate lines G1 to Gn based on the gate control signal CONT1 from the signal controller 600 to turn on the switching elements (not illustrated) connected to the gate lines G1 to Gn. Then, the data voltages applied to the data lines D1 to Dm are applied to the corresponding pixels PX through the turned-on switching elements (not illustrated).

A difference between the data voltage applied to the pixel PX and the common voltage is represented as a charging voltage of a liquid crystal capacitor Clc, that is, a pixel voltage. The arrangement of the liquid crystal molecules varies by a magnitude of the pixel voltage, and as a result, polarization of light passing through the liquid crystal layer 3 is changed. The change in the polarization is represented as a change in transmittance of light by a polarizer, and as a result, the pixel PX displays luminance expressed by a grayscale of the image signal DAT.

The process described above is performed during 1 horizontal period ("1H"), which is one period of a horizontal synchronization signal Hsync and a data enable signal DE, is repeated, and as a result, the gate-on voltages Von are sequentially applied to all the gate lines G1 to Gn and the data voltages are applied to all the pixels PX to display an image of a frame.

When one frame ends, the next frame starts, and a state of the inversion signal applied to the data driver 500 is controlled such that the polarity of the data voltage applied to each pixel PX is opposite to the polarity in the previous frame (e.g., frame inversion). In an exemplary embodiment, a polarity of the data voltage flowing through one data line may be periodically changed in each frame by the inversion signal (e.g., row inversion or dot inversion), or polarities of data voltages applied to one pixel row may be different from each other (e.g., column inversion or dot inversion).

Figure 2:
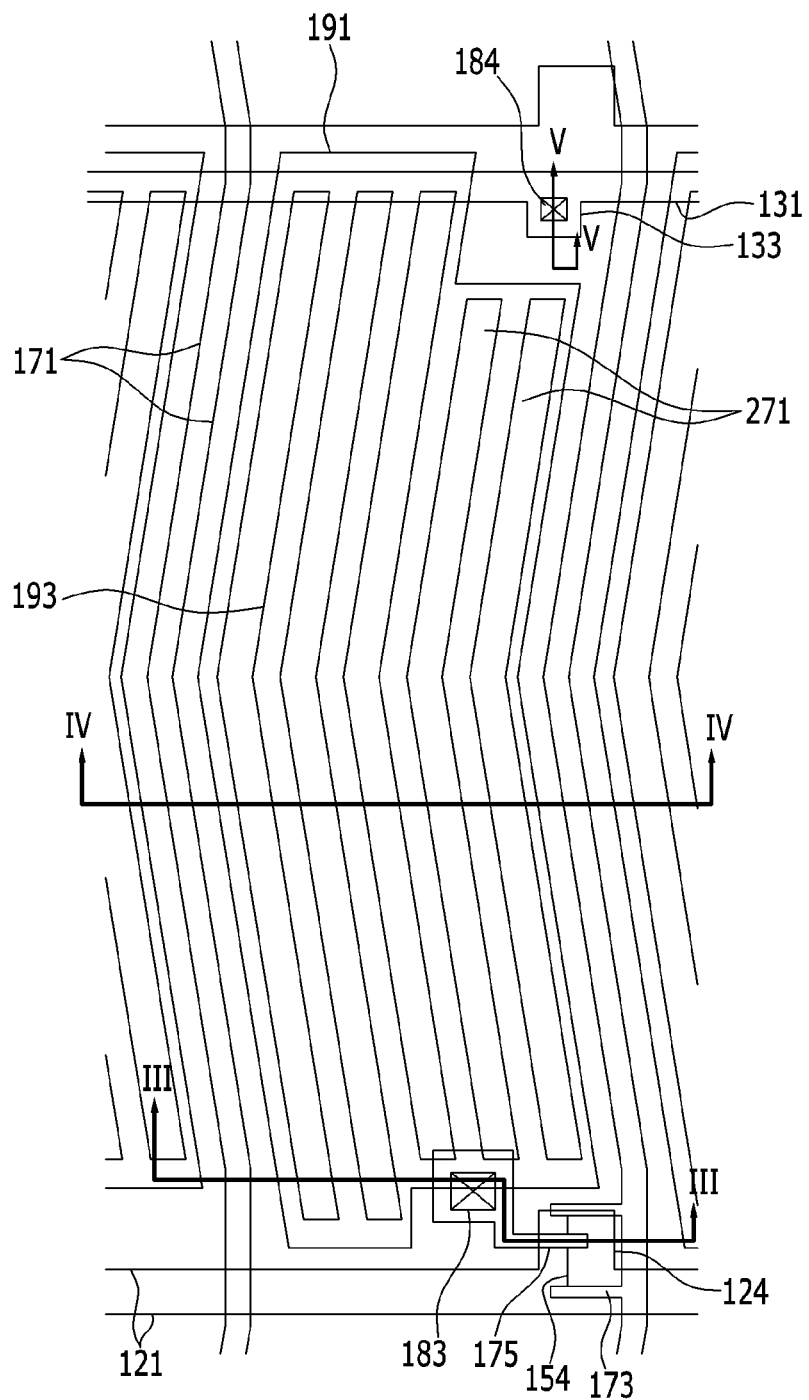
FIG. 2 is a layout view illustrating an exemplary embodiment of a liquid crystal display, according to the invention.
Figure 3:
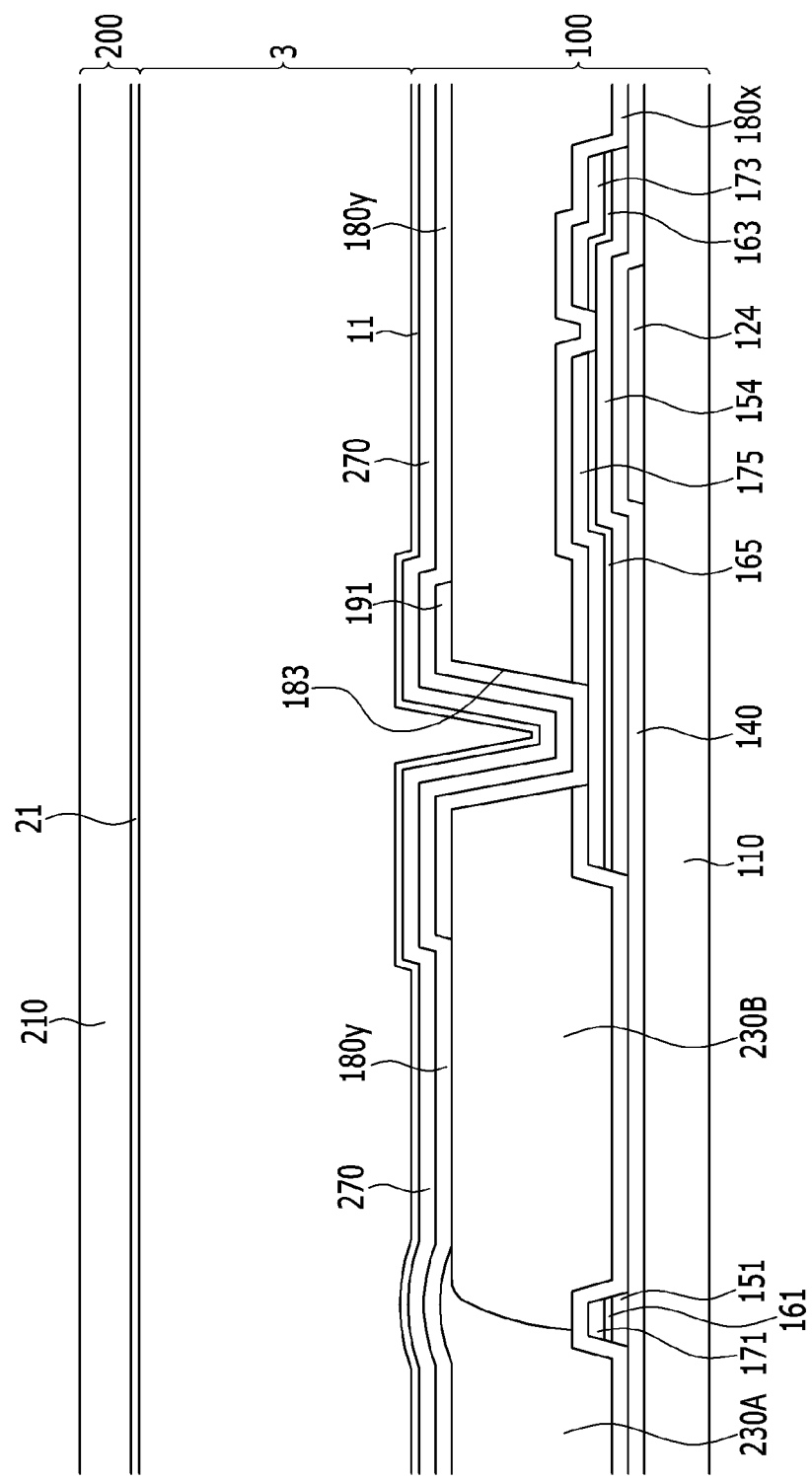
FIG. 3 is a cross-sectional view taken along line III-III of the liquid crystal display of FIG. 2.
Figure 4:
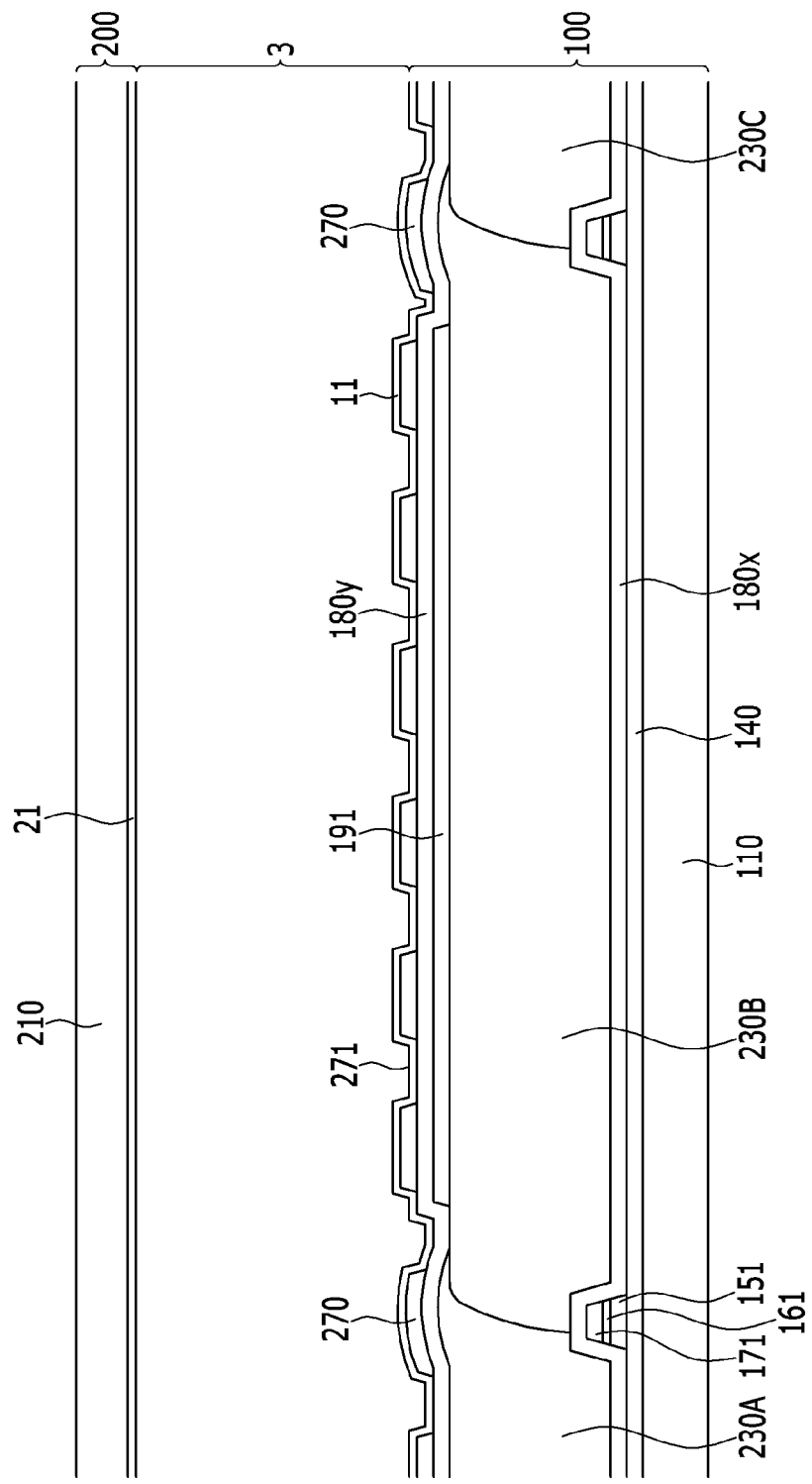
FIG. 4 is a cross-sectional view taken along line IV-IV of the liquid crystal display of FIG. 2.
Figure 5:
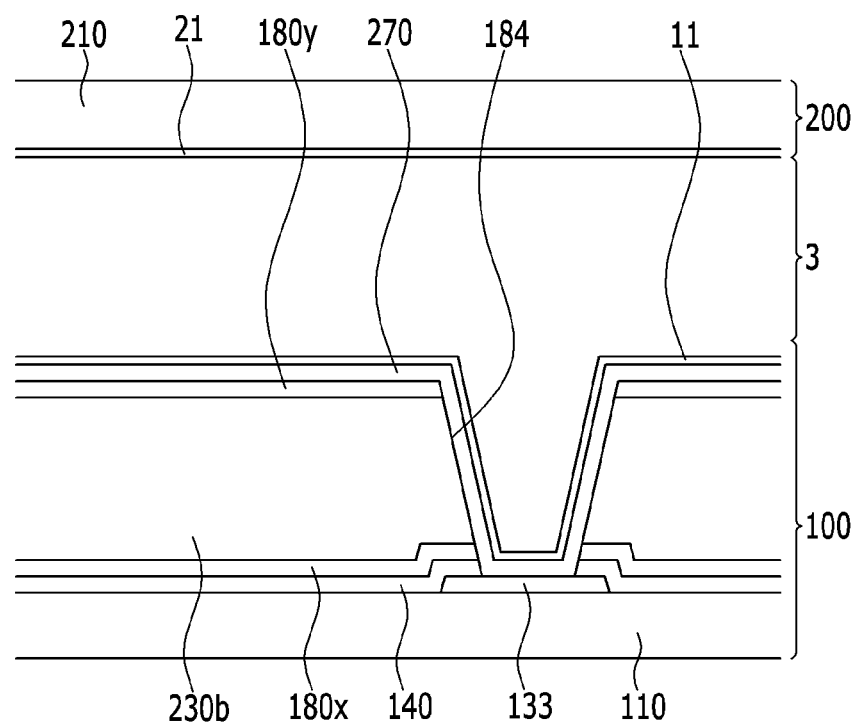
FIG. 5 is a cross-sectional view taken along line V-V of the liquid crystal display of FIG. 2.

Next, an exemplary embodiment of a display device, according to the invention, will be described with reference to FIGS. 2 to 5. FIG. 2 is a plan view of an exemplary embodiment of a liquid crystal display, according to the invention. FIG. 3 is a cross-sectional view taken along line III-III of the liquid crystal display of FIG. 2. FIG. 4 is a cross-sectional view taken along line IV-IV of the liquid crystal display of FIG. 2. FIG. 5 is a cross-sectional view taken along line II-II of the liquid crystal display of FIG. 2.

Referring to FIGS. 2 to 5, the display device may be a liquid crystal display that includes two panels facing each other, e.g., a lower panel 100 and an upper panel 200, and a liquid crystal layer 3 interposed between the two panels 100 and 200.

First, the lower panel 100 will be described in detail. In the lower panel 100, a plurality of gate lines 121 including a plurality of gate electrodes 124, and a common electrode line 131 including a plurality of extensions 133 are disposed on a lower insulating substrate 110, and a gate insulating layer 140 is disposed on the gate lines 121 and the common electrode lines 131. A plurality of semiconductors 151 including a plurality of protrusions 154 is disposed on the gate insulating layer 140, and a plurality of ohmic contacts 161, 163 and 165 is disposed on the semiconductors 151 and 154. A data conductor including a plurality of data lines 171 and a plurality of drain electrodes 175 is disposed on the ohmic contacts 161, 163 and 165. The data line 171 may be periodically curved and may form an oblique angle with an extending direction of the gate line 121. The oblique angle between the data line 171 and the extending direction of the gate line 121 may be about 45° or more. In an alternative exemplary embodiment of a liquid crystal display, the data line 171 may extend substantially in a straight line.

A first passivation layer 180x is disposed on the data conductor 171, 173 and 175 and the exposed semiconductor protrusion 154, and the first passivation layer 180x may include an organic insulating material, an inorganic insulating material, or the like.

A plurality of color filters 230A, 230B and 230C is disposed on the first passivation layer 180x. Each of the color filters 230A, 230B and 230C may display one of the primary colors, e.g., three primary colors such as red, green and blue, yellow, cyan and magenta, or the like. In an exemplary embodiment, the color filters may further include a color filter (not shown) that displays a mixed color of the primary colors or a white color in addition to the primary colors. The color filters 230A, 230B and 230C may include organic materials. Each of the color filters 230A, 230B and 230C may be elongated along the data line 171, and two color filters 230A and 230B, or 230B and 230C, which are adjacent to each other on a boundary of the data line 171, may overlap each other.

In an alternative exemplary embodiment of the invention, each of the color filters 230A, 230B and 230C may be disposed in the upper panel 200. In such an embodiment, each of the color filters 230A, 230B and 230C may be disposed on a second alignment layer 21 of the upper panel 200.

In an exemplary embodiment, as shown in FIGS. 3 and 4, a plurality of pixel electrodes 191 is disposed on the color filters 230A, 230B and 230C. A pixel electrode 191 may have a plane shape which overlaps substantially an entire region surrounded by the gate line 121 and the data line 171. The overall shape of the pixel electrode 191 may be generally a polygon having sides which are substantially parallel to the gate line 121 and the data line 171. The pixel electrode 191 may include a transparent conductive material such as indium tin oxide ("ITO") or indium zinc oxide ("IZO"), for example.

A second passivation layer 180y is disposed on the color filters 230A, 230B and 230C and the pixel electrode 191. The second passivation layer 180y may include an organic insulator, or an inorganic insulator.

A common electrode 270 is disposed on the second passivation layer 180y. The common electrode 270 may include a transparent conductive material such as ITO or IZO, for example.

The common electrode includes a plurality of common electrode plates, which cover corresponding pixel electrode and are arranged substantially in a matrix form. In such an embodiment, an opening 271 is defined in each common electrode plate.

As described herein, in an exemplary embodiment, the opening 271 is defined in the common electrode plate of the common electrode 270, and the pixel electrode 191 is disposed below the common electrode, but the invention is not limited thereto. In an alternative exemplary embodiment, the pixel electrode 191 may be defined by the common electrode plate, a branch opening may be defined in each common electrode plate of the pixel electrode 191, and the common electrode 270 may be disposed below the pixel electrode 191.

Hereinafter, a whole plate configuring the common electrode 270 will be described as common electrode plates 270a, 270b and 270c. The common electrode plates 270a, 270b and 270c configuring the common electrode 270 are separated or spaced apart from each other. A structure of the common electrode plates 270a, 270b and 270c will be described later in greater detail with reference to FIG. 6.

In an exemplary embodiment, as shown in FIG. 3, an opening 271 is defined in the common electrode 270, e.g., in an area of the common electrode 270 corresponding to a periphery of the drain electrode 175.

A first contact hole 184 that exposes the expansion 133 of the common voltage line 131 is defined through the gate insulating layer 140, the first passivation layer 180x and the color filter 230B. In such an embodiment, in some pixels, the first contact hole 184 of the invention may be omitted.

The common electrode 270 is physically and electrically connected to the expansion 133 of the common electrode line 131 through the first contact hole 184.

In an exemplary embodiment, a plurality of openings 271 is defined in the common electrode 270 in each pixel area. The openings 271 may be substantially parallel to each other and curved along the data line 171. In an alternative exemplary embodiment of a liquid crystal display according to the invention, the data line 171 and the openings 271 of the pixel electrode 270 may extend substantially in a straight line.

The openings 271 of the common electrode 270 overlap the pixel electrode 191.

A plurality of contact holes 183 that exposes a portion of the drain electrode 175 is defined through the first passivation layer 180x and the color filters 230A, 230B and 230C, and the pixel electrode 191 is electrically connected to the drain electrode 175 through the contact hole 183 to receive a data voltage.

The pixel electrode 191 receiving the data voltage generates an electric field in the liquid crystal layer 3 together with the common electrode 270 receiving the common voltage.

The common electrode 270 covers substantially an entire of the data lines 171 and overlaps the data lines 171. Accordingly, a crosstalk between the data line 171 and the pixel electrode 191 may be reduced, and light leakage due to parasitic capacitance between the data line 171 and the adjacent pixel electrode 191 may be reduced.

A first alignment layer 11 is disposed, e.g., coated, on an inner surface of the lower panel 100.

Next, the upper panel 200 will be described.

In the upper panel 200, the second alignment layer 21 is disposed, e.g., coated, on an upper insulating substrate 210.

In such an embodiment, the first alignment layer 11 and the second alignment layer 21 may be horizontal alignment layers.

The liquid crystal layer 3 interposed between the lower panel 100 and the upper panel 200 includes liquid crystal molecules, and the liquid crystal molecules may be aligned such that longitudinal axes thereof are substantially horizontal to opposing surfaces of the two panels 100 and 200 when an electric field is not generated therein.

A backlight unit (not illustrated) that generates light to supply the light to the two panels 100 and 200 may be further included at an outside of the lower insulating substrate 110 of the lower panel 100.

The pixel electrode 191, to which the data voltage is applied, generates an electric field in the liquid crystal layer 3 together with the common electrode 270 that receives the common voltage to determine directions of the liquid crystal molecules of the liquid crystal layer 3 and display the corresponding image.

Next, an exemplary embodiment of the display device, according to the invention, will be described with reference to FIGS. 6 to 12.

Figure 6:
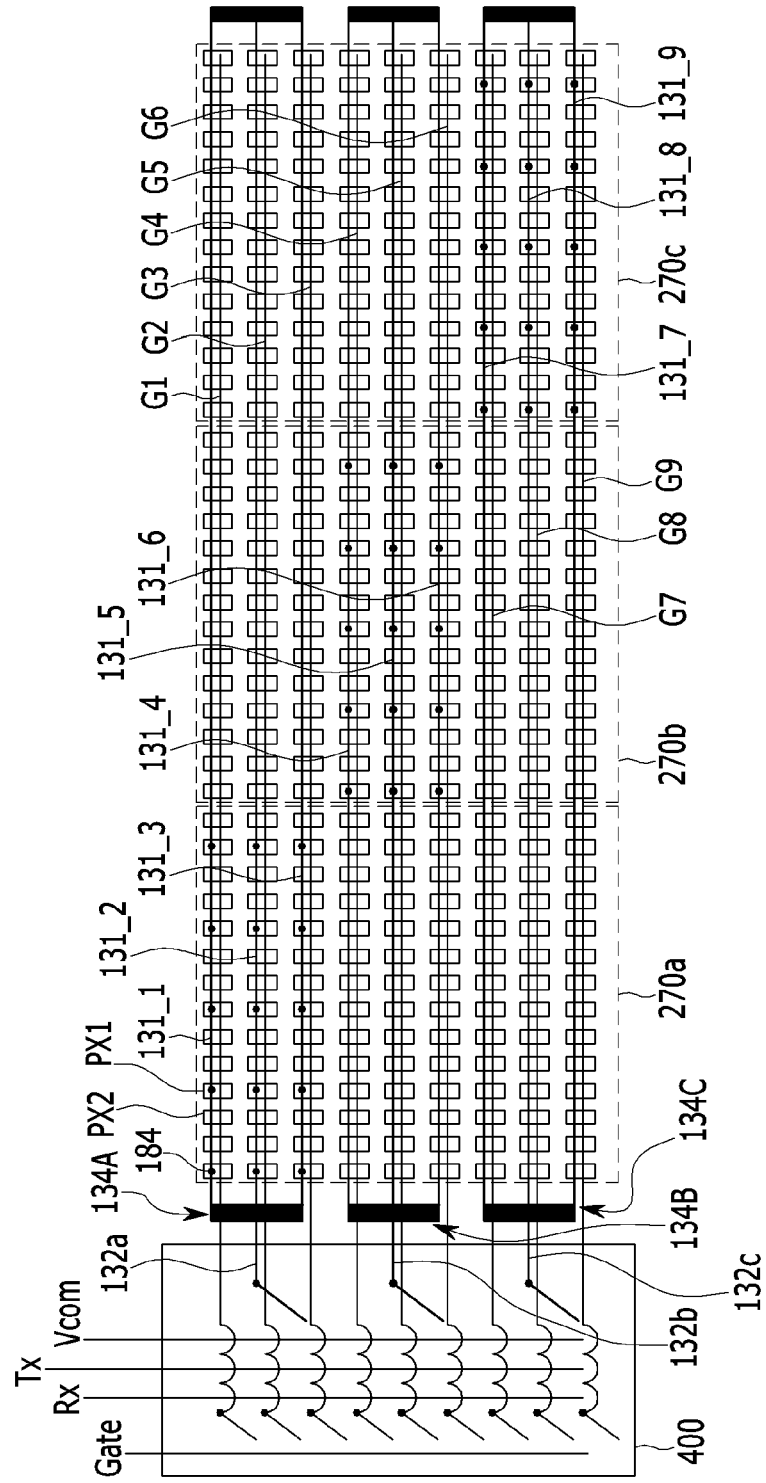
FIG. 6 is a diagram illustrating an alternative exemplary embodiment of a display device, according to the invention.

FIG. 6 is a diagram illustrating an exemplary embodiment of a display device, according to the invention.

First, a configuration of an exemplary embodiment of a display device, according to the invention, will be described in greater detail with reference to FIG. 6.

Hereinafter, for convenience of description, three common electrode plates, e.g., a first common electrode plate 270a, a second common electrode plate 270b and a third common electrode plate 270c, will be described. However, the invention is not limited thereto. In an exemplary embodiment, as shown in FIG. 6, each common electrode plate may correspond to 14×9 pixels PX, but the invention is not limited thereto. Here, each of the pixels may be a pixel that displays a predetermined color. In one exemplary embodiment, for example, each of the pixels may express red, green or blue. In an exemplary embodiment, a size of each of the common electrode plates 270a, 270b and 270c may be about 4 millimeters (mm)×about 5 millimeters (mm).

According to an exemplary embodiment of the invention, the first common electrode plate 270a is connected to the first common electrode line group 134A through the first contact hole 184. In such an embodiment, the second common electrode plate 270b is connected to the second common electrode line group 134B through the first contact hole 184. Further, the third common electrode plate 270c is connected to the third common electrode line group 134C through the first contact hole 184. In such an embodiment, each common electrode plate is connected to a corresponding common electrode line group. The common electrode plate is connected to the common electrode line group through the first contact hole 184. The first contact hole 184 is not in all the pixels PX. In an exemplary embodiment, the display panel 300 includes a first pixel PX1 in which the first contact hole 184 is defined, and a second pixel PX2 without the first contact hole 184.

According to an exemplary embodiment of the invention, the first pixel PX1 corresponding to the first common electrode plate 270a, may be one of the pixels along which the first common electrode line group 134A extends. In such an embodiment, the first pixel PX1 corresponding to the second common electrode plate 270b may one of the pixels along which the second common electrode line group 134B extends. The pixel PX1 corresponding to the third common electrode plate 270c may be one of the pixels along which the third common electrode line group 134C extends.

In such an embodiment, the first common electrode line group 134A overlaps the second common electrode plate 270b and the third common electrode plate 270c. In such an embodiment, the second common electrode line group 134B overlaps the first common electrode plate 270a and the third common electrode plate 270c, and the third common electrode line group 134C overlaps the first common electrode plate 270a and the second common electrode plate 270b.

A switch is connected to each of the touch signal lines 132a, 132b and 132c connected to the common electrode line groups 134A, 134B and 134C, respectively.

In an exemplary embodiment, a plurality of signal lines may be disposed in the gate driver 400. Through the signal lines disposed in the gate driver 400, the common voltage Vcom or the sensing input signal TX is supplied or the sensing output signal RX is received. According to an alternative exemplary embodiment of the invention, the signal lines to which the common voltage Vcom or the sensing input signal TX is supplied or the sensing output signal RX is received may be disposed outside the gate driver 400.

According to an exemplary embodiment of the invention, the signal lines, to which the common voltage Vcom or the sensing input signal TX is supplied or the sensing output signal RX is received, may be disposed in the touch signal processor 900 inside the gate driver 400.

Hereinafter, an exemplary embodiment of an operating method of the display device, according to the invention, will be described with reference to FIG. 7.

Figure 7:
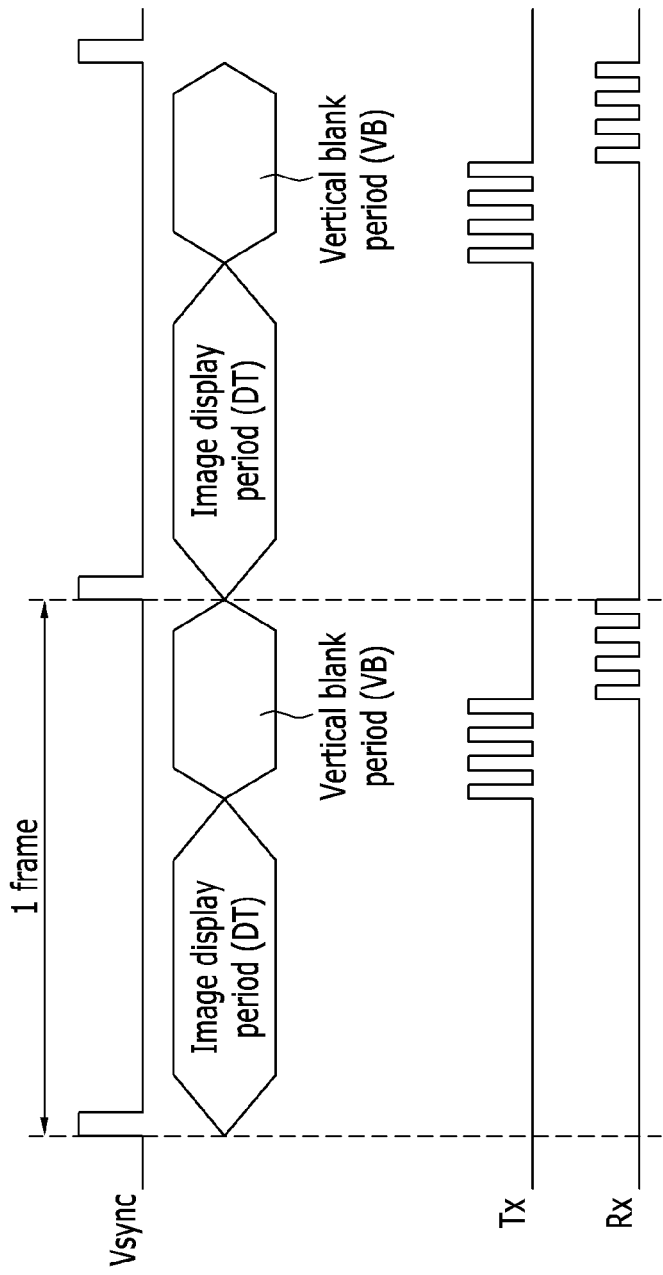
FIG. 7 is a timing diagram of respective signals of an exemplary embodiment of the display device according to the invention.

FIG. 7 is a timing diagram of respective signals of an exemplary embodiment of the display device, according to the invention.

One frame, which is a period for displaying an image by the display panel 300, starts in synchronization with a pulse of the vertical synchronization signal Vsync. Each frame includes an image display period DT for displaying an image by all the pixels PX and a vertical blank period VB as illustrated in FIG. 7. The vertical blank period VB may be between the image display periods DT of adjacent frames.

Referring to FIG. 7, when the image display periods DT ends and the vertical blank period VB starts, a touch sensing period may start. In an exemplary embodiment, the touch sensing period is included in the vertical blank period VB illustrated in FIG. 7. In an exemplary embodiment, a length of the touch sensing period may be shorter than or equal to a length of the vertical blank period VB. In such an embodiment, the sensing input signal TX is supplied or the sensing output signal RX is output to any one of the touch signal lines 132a, 132b and 132c during the vertical blank period VB. In an exemplary embodiment, a period of the sensing output signal RX may be shorter than or equal to a period of the sensing input signal TX. In an exemplary embodiment, the sensing output signal RX may be output to one of the touch signal lines 132a, 132b and 132c after the sensing input signal TX is supplied the one of the touch signal lines 132a, 132b and 132c. According to an exemplary embodiment of the invention, as illustrated in FIG. 7, the sensing input signal TX and the sensing output signal RX may be square waves. However, the invention is not limited thereto. In an alternative exemplary embodiment, the sensing input signal TX or the sensing output signal RX may be other shaped waveforms in any degree. Hereinafter, for convenience of description, an exemplary embodiment in which the sensing input signal TX or the sensing output signal RX is the square wave will be described in detail.

During an image display period, the switches connected to the touch signal lines 132a, 132b and 132c are connected to a first signal line to which the common voltage Vcom is supplied. Accordingly, the common voltage Vcom is applied to all the common electrode plates 270a, 270b and 270c through the common electrode lines connected to the touch signal lines 132a, 132b and 132c.

Then, during the vertical blank period VB, the switch of the first touch signal line 132a connected to the first common electrode line group 134A is connected to a second signal line to which the sensing input signal TX is supplied, such that the sensing input signal TX is supplied to the first common electrode line group. Then, the switch of the first touch signal line 132a is connected to a third signal line to which the sensing output signal RX is output, such that the sensing output signal RX is output from the first common electrode line group 134A to the first touch signal line 132a. Next, the touch signal processor 900 senses the sensing output signal RX to determine an occurrence of a touch in an area corresponding to the first common electrode plate 270a.

The touch signal processor 900 determines an occurrence of the touch based on the magnitude of the sensing output signal RX. When the touch occurs in the area corresponding to one of the common electrode plates 270a, 270b and 270c, due to resistance by the touch, a difference between the size of the sensing input signal TX and the size of the sensing output signal RX when the touch does not exist may be greater than a difference between the size of the sensing input signal TX and the size of the sensing output signal RX when the touch exists. According to an alternative exemplary embodiment of the invention, the touch signal processor 900 may determine the occurrence of the touch by comparing the sensing output signal RX with a waveform of a pre-stored signal.

When the switch of the first touch signal line 132a connected to the first common electrode line group 134A is connected to the second or third signal line to which the sensing input signal TX is supplied or the sensing output signal RX is output, all the switches connected to other touch signal lines, e.g., the second and third touch signal lines 132b and 132c, may be off. In an exemplary embodiment, as described above, the touch signal processor 900 determines whether or not the touch exists.

Then, the switch of the second touch signal line 132b is connected to the second signal line to which the sensing input signal TX is supplied such that the sensing input signal TX is supplied to the second common electrode line group. Then, the switch of the second touch signal line 132b is connected to the third signal line to which the sensing output signal RX is output such that the sensing output signal RX is output from the second common electrode line group 134B to the second touch signal line 132b. Next, the touch signal processor 900 senses the sensing output signal RX to determine whether or not the touch exists in an area corresponding to the second common electrode plate 270b. When the switch of the second touch signal line 132b connected to the second common electrode line group 134b is connected to the second or third signal line to which the sensing input signal TX is supplied or the sensing output signal RX is output, all the switches connected to other touch signal lines, e.g., the first and third touch signal lines 132a and 132c, may be off.

Then, the switch of the third touch signal line 132c is connected to the second signal line to which the sensing input signal TX is supplied such that the sensing input signal TX is supplied to the third common electrode line group. Then, the switch of the third touch signal line 132c is connected to the third signal line to which the sensing output signal RX is output such that the sensing output signal RX is output from the third common electrode line group 134C to the third touch signal line 132c. Then, the touch signal processor 900 senses the sensing output signal RX to determine whether or not the touch exists in an area corresponding to the third common electrode plate 270c.

Thereafter, when the vertical blank period VB of a frame ends and the image display period of a next frame starts again, the switches connected to the plurality of touch signal lines 132a, 132b and 132c are connected to the first signal line to which the common voltage Vcom is supplied. The common voltage Vcom is applied to all the common electrode plates 270a, 270b and 270c through the touch signal lines 132a, 132b and 132c again.

As such, during the vertical blank period VB, the switch of the touch signal line is connected to the second signal line to which the sensing input signal TX is supplied, and then connected to the third signal line to which the sensing output signal RX is output. Thereafter, when the switch is off, the switch connected to the next touch signal line repeats the same operation. In such a manner, the switches connected to all the touch signal lines operate. When the switches connected to all the touch signal lines finish the operation described above, the switches connected to all the touch signal lines are again connected to the first signal line to which the common voltage Vcom is applied.

Figure 8:
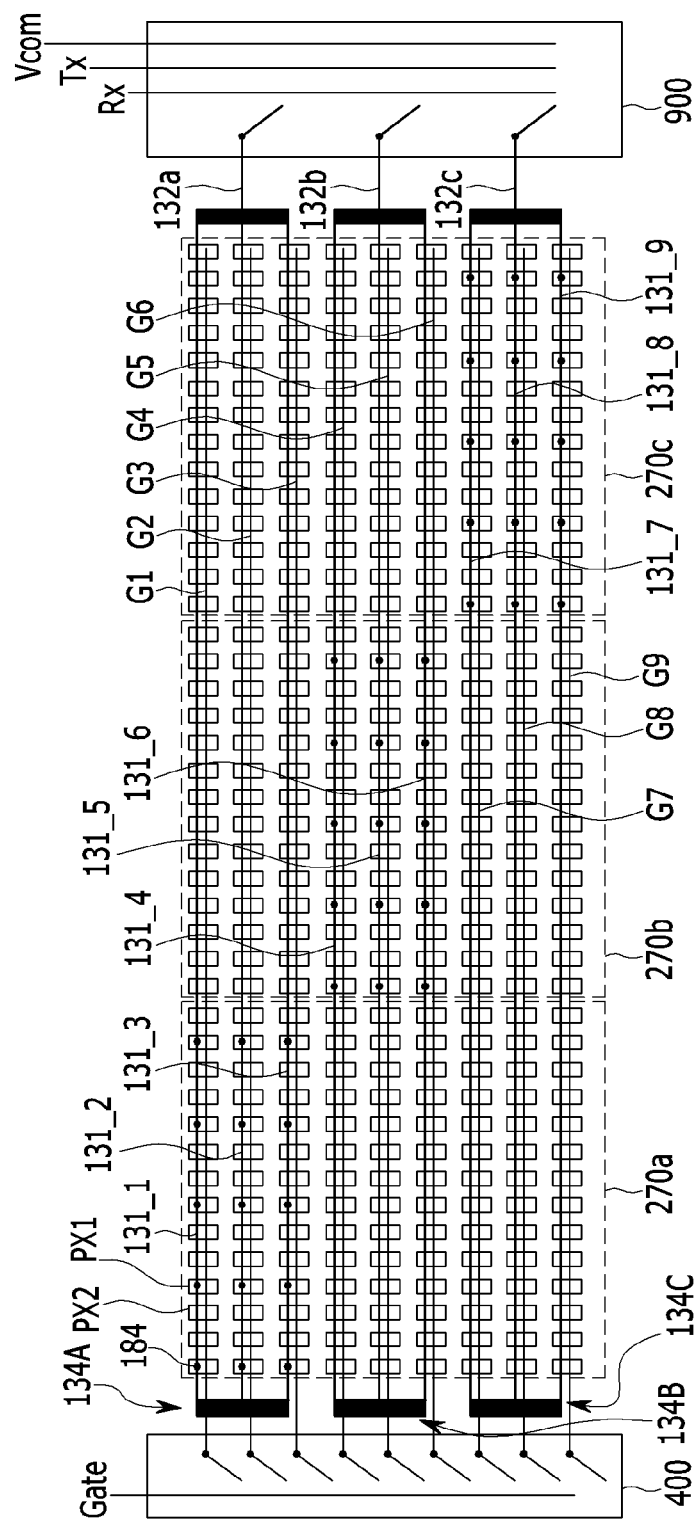
FIG. 8 is a diagram of another alternative exemplary embodiment of a display device, according to the invention.

FIG. 8 is a diagram illustrating an alternative exemplary embodiment of a display device, according to the invention.

The display device in FIG. 8 is substantially the same as the display device shown in FIGS. 6 and 7 except for the first signal line to which the common voltage Vcom or the sensing input signal TX is supplied or the sensing output signal RX is received. The same or like elements shown in FIG. 8 have been labeled with the same reference characters as used above to describe the exemplary embodiments of the display device shown in FIGS. 6 and 7, and any repetitive detailed description thereof will hereinafter be omitted or simplified.

As illustrated in FIG. 8, in an alternative exemplary embodiment of the invention, the first, second or third signal line, to which the common voltage Vcom or the sensing input signal TX is supplied or the sensing output signal RX is received, may be disposed outside of the gate driver 400. In such an embodiment, the first, second or third signal line to which the common voltage Vcom or the sensing input signal TX is supplied or the sensing output signal RX is received may be disposed in the touch signal processor 900 outside the gate driver 400.

Figure 9:
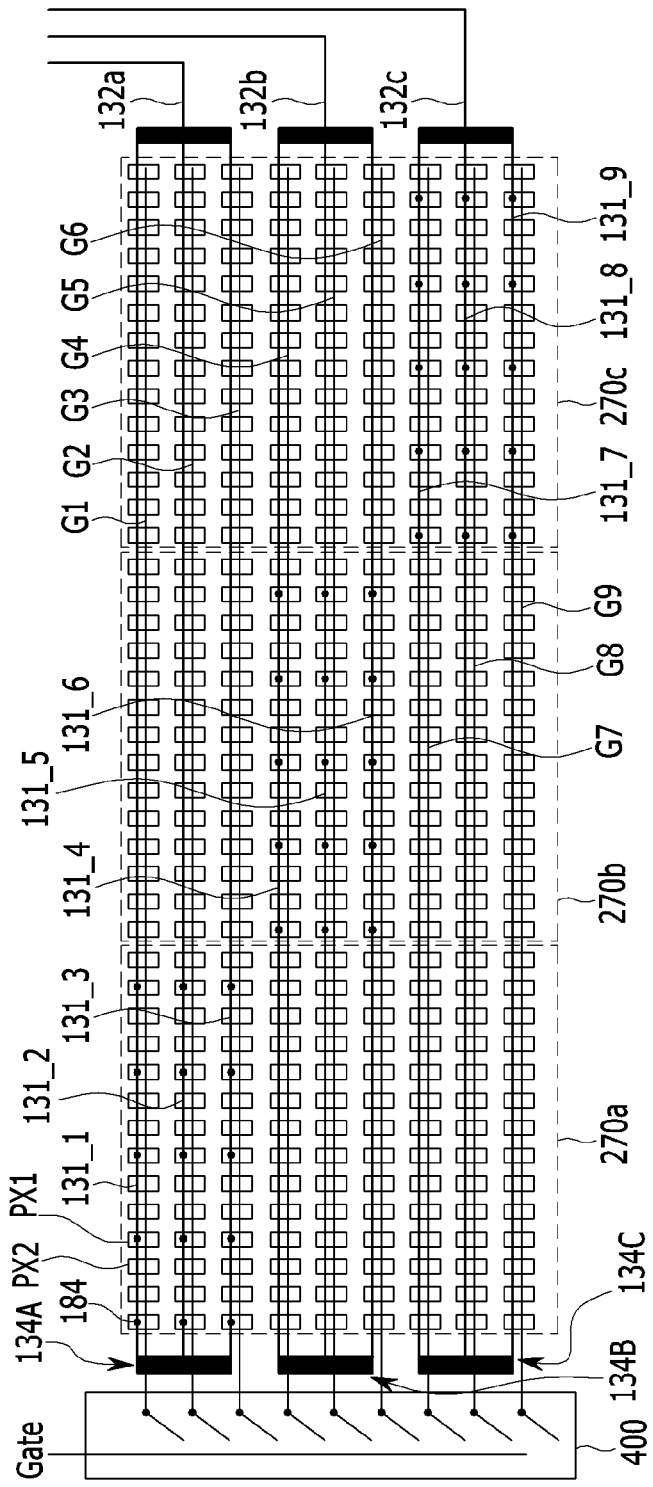
FIG. 9 is a diagram of another alternative exemplary embodiment of a display device, according to the invention.

FIG. 9 is a diagram illustrating another alternative exemplary embodiment of a display device, according to the invention.

The display device in FIG. 9 is substantially the same as the display device shown in FIG. 8 except for the touch signal processor. The same or like elements shown in FIG. 9 have been labeled with the same reference characters as used above to describe the exemplary embodiments of the display device shown in FIG. 8, and any repetitive detailed description thereof will hereinafter be omitted or simplified.

According to another exemplary embodiment of the invention, as shown in FIG. 9, the touch signal processor 900 may be disposed in the signal controller 600, that is, the signal controller 600 may function as the touch signal processor 900. In such an embodiment, the touch signal lines 132a, 132b and 132c are connected to the signal controller 600. In such an embodiment, during the image display periods DT, the common voltage Vcom is applied to the touch signal lines 132a, 132b and 132c. Thereafter, during the vertical blank period VB, the sensing input signal TX is supplied from a touch signal line, e.g., the first touch signal line 132a, and the sensing output signal RX is output from the touch signal line 132a. The signal controller 600 senses the sensing output signal RX to determine whether or not the touch exists in an area corresponding to the first common electrode plate 270a connected to the first touch signal line 132a.

Thereafter, the operations described above are sequentially repeated on all of the touch signal lines.

Next, another alternative exemplary embodiment of a display device will be described with reference to FIGS. 10 and 11.

Figure 10:
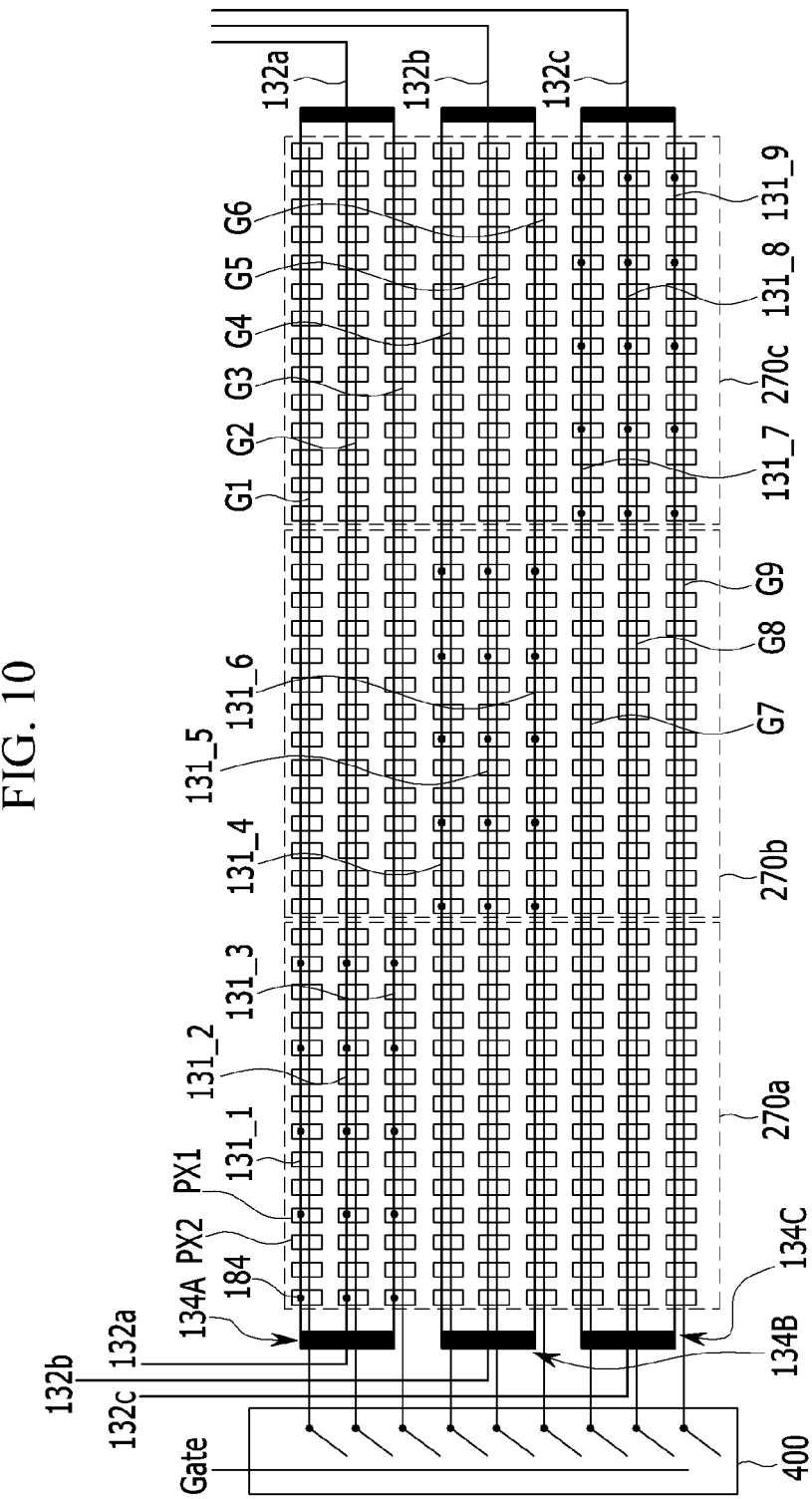
FIG. 10 is a diagram of another alternative exemplary embodiment of a display device, according to the invention.

FIG. 10 is a diagram illustrating another alternative exemplary embodiment of a display device, according to the invention.

The display device in FIG. 10 is substantially the same as the display device shown in FIG. 9 except that both ends of the common electrode line groups are connected to the touch signal lines. The same or like elements shown in FIG. 10 have been labeled with the same reference characters as used above to describe the exemplary embodiments of the display device shown in FIG. 9, and any repetitive detailed description thereof will hereinafter be omitted or simplified.

In an exemplary embodiment, as illustrated in FIG. 10, both ends of the common electrode line groups 134A, 134B and 134C are connected to the touch signal lines 132a, 132b and 132c, respectively.

Figure 11:
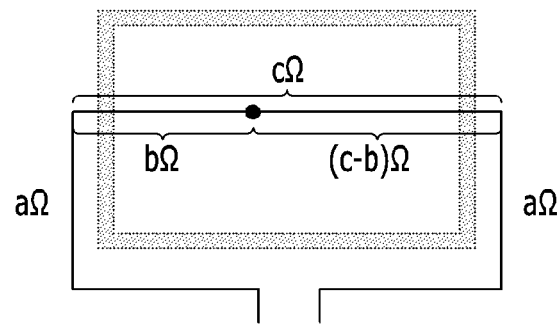
FIG. 11 is a reference diagram for describing an effect when touch signal lines are connected to both ends of a common electrode line group.

FIG. 11 is a reference diagram for describing an effect when touch signal lines are connected to both ends of a common electrode line group.

Referring to FIG. 11, when all the touch signal lines 132a, 132b and 132c are connected to both ends of each of the common electrode line groups 134A, 134B and 134C, line resistance is decreased due to a dual-routing effect.

When line resistance when the touch signal line is connected to one side of the common electrode line is denoted by R, resistance of the touch signal line is a, resistance of the common electrode line is denoted by c, and resistance of a part of the common electrode line is denoted by b, the following equation is satisfied: $R=[(a+b)\times(c-b+a)]/[(a+b)+(c-b+a)]=(ac-ab-a^2+bc+b^2+ab)/(2a+c)=(a^2+ac+bc-b^2)/$ (2a+c). In such an embodiment, as shown in FIG. 11, where b=c/2, R becomes (2a+c)/4, and thus the line resistance is decreased.

The operation of the display device shown in FIG. 11 is substantially the same as the operation of the display device described in FIG. 9.

Figure 12:
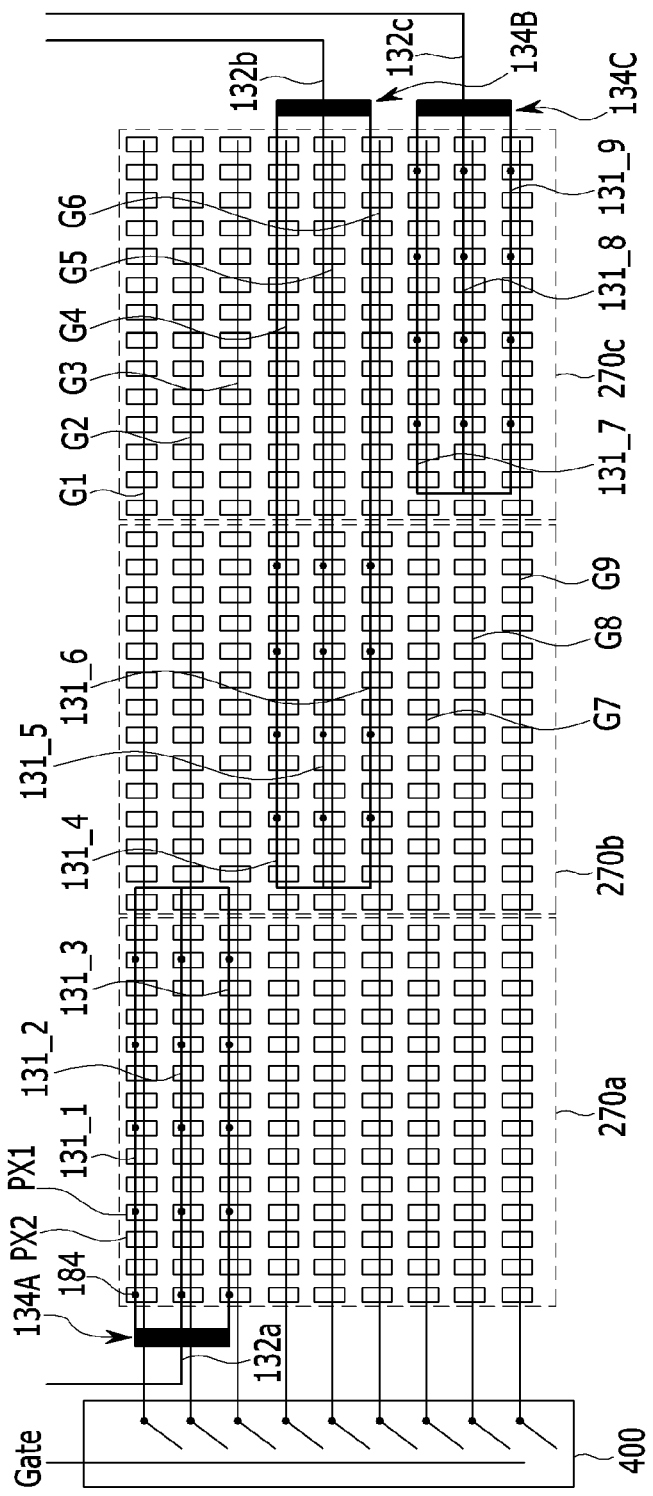
FIG. 12 is a diagram of another alternative exemplary embodiment of a display device, according to the invention.

FIG. 12 is a diagram illustrating another alternative exemplary embodiment of a display device, according to the invention.

The display device in FIG. 12 is substantially the same as the display device shown in FIG. 9 except for the touch signal lines and the common electrode lines. The same or like elements shown in FIG. 12 have been labeled with the same reference characters as used above to describe the exemplary embodiments of the display device shown in FIG. 9, and any repetitive detailed description thereof will hereinafter be omitted or simplified.

In an exemplary embodiment, each of the touch signal lines 132a, 132b and 132c are connected to one side of a corresponding common electrode line group of the common electrode line groups 134A, 134B and 134C. In such an embodiment, the connection of the touch signal lines 132a, 132b and 132c may be disposed in different sides from each other. In one exemplary embodiment, as shown in FIG. 12, the first touch signal line 132a is connected to one end of the first common electrode line group 134A, and the second touch signal line 132b and the third touch signal line 132c may be disposed in a different side of the first touch signal line 132a from a side at which the first touch signal line 132a is connected to the one end of the first common electrode line group 134A. However, the invention is not limited thereto. In an alternative exemplary embodiment, the signal line may be disposed in a different direction in any degree. In such an embodiment, each of the touch signal lines 132a, 132b and 132c are disposed at only one side, such that a space occupied by the touch signal lines 132a, 132b and 132c at one side is effectively prevented from being increased.

According to an exemplary embodiment, as shown in FIG. 12, the first common electrode line group 134A overlaps only the first common electrode plate 270a, but does not overlap the second common electrode plate 270b and the third common electrode plate 270c.

In such an embodiment, as shown in FIG. 12, the second common electrode line group 134B overlaps the second common electrode plate 270b and the third common electrode plate 270c, but does not overlap the first common electrode plate 270a.

In such an embodiment, as shown in FIG. 12, the third common electrode line group 134C does not overlap the first common electrode plate 270a and the second common electrode plate 270b, but overlaps the third common electrode plate 270c.

In such an embodiment, as described above, each of the common electrode line groups 134A, 134B and 134C may overlap only a portion of the common electrode plates 270a, 270b and 270c.

The operation of the display device shown in FIG. 12 is the same as the operation of the display device described in FIG. 9.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a first substrate;
a plurality of pixel electrodes disposed on the first substrate;
a common electrode comprising a plurality of common electrode plates disposed on the first substrate, wherein the common electrode plates cover the pixel electrodes and are arranged substantially in a matrix form;
a plurality of common electrode line groups which applies a common voltage to the common electrode plates; and
a plurality of touch signal lines to which the common voltage and a sensing input signal are applied,
wherein laterally adjacent common electrode plates of the common electrode plates are connected to different common electrode line groups,
each of the plurality of common electrode line groups includes a plurality of common electrode lines that are connected to one of the plurality of common electrode plates and commonly connected to a single touch signal line of the plurality of touch signal lines, and
each of the plurality of common electrode line groups transmits the sensing input signal to one of the plurality of common electrode plates and a sensing output signal from the one of the plurality of common electrode plates.

2. The display device of claim 1, further comprising:
a touch signal processor which determines an occurrence of a touch based on the sensing output signal from the touch signal lines,
wherein the laterally adjacent common electrode plates are connected to different touch signal lines.

3. The display device of claim 2, wherein
the touch signal lines are connected to the common electrode line groups, respectively.

4. The display device of claim 3, further comprising:
a first signal line which applies the common voltage to the touch signal lines;
a second signal line which applies the sensing input signal to the touch signal lines; and
a third signal line which receives the sensing output signal from the touch signal lines.

5. The display device of claim 4, wherein
the first signal line, the second signal line or the third signal line is disposed in the touch signal processor.

6. The display device of claim 5, wherein
when the display device displays an image, the touch signal lines are all connected to the first signal line to receive the common voltage, and
when the display device does not display the image, one of the touch signal lines receives the sensing input signal through the second signal line, and then the one of the touch signal lines outputs the sensing output signal through the third signal line.

7. The display device of claim 6, further comprising:
a gate driver which applies a gate voltage to a plurality of pixels comprising the pixel electrodes,
wherein the touch signal processor is disposed in the gate driver.

8. The display device of claim 6, further comprising:
a gate driver which applies a gate voltage to a plurality of pixels comprising the pixel electrodes; and
a signal processor which controls the gate driver,
wherein the touch signal processor is disposed in the signal processor.

9. The display device of claim 8, wherein
two different touch signal lines are disposed at opposing sides of the common electrode plates, respectively.
10. The display device of claim 6, wherein
a size of each of the common electrode plates is about 4 millimeters×about 5 millimeters.
11. The display device of claim 6, wherein
a period during which the display device does not display the image corresponds to a vertical blank period.
12. The display device of claim 6, wherein
the common electrode is disposed above the pixel electrodes.
13. The display device of claim 6, wherein
a plurality of openings is defined in the common electrode plates.
14. The display device of claim 13, wherein
each of the openings in the common electrode plates is curved.
15. The display device of claim 6, further comprising:
a plurality of data lines disposed on the first substrate; and
a plurality of gate lines disposed on the first substrate,
wherein the data lines and gate lines cross each other, and are insulated from each other.
16. The display device of claim 15, wherein
the common electrode line groups are disposed in a same layer as the gate lines.
17. The display device of claim 16, wherein
each of the common electrode line groups comprises three common electrode lines.
18. The display device of claim 17, wherein
each of the common electrode line groups is connected to a corresponding common electrode plate of the common electrode plates through a contact hole.
19. The display device of claim 18, further comprising:
a liquid crystal layer disposed on the first substrate.
20. The display device of claim 19, further comprising:
a second substrate disposed on the liquid crystal layer.

* * * * *